US010298831B2

(12) United States Patent
Shimosato (10) Patent No.: US 10,298,831 B2
(45) Date of Patent: May 21, 2019

(54) IMAGE CAPTURING APPARATUS AND METHOD OF CONTROLLING SAME WITH NOTIFICATION WHETHER TO STOP MOVING IMAGE RECORDING (71) Applicant: CANON KABUSHIKI KAISHA, Tokyo (JP)

(72) Inventor: Jiro Shimosato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/966,055

(22) Filed: Apr. 30, 2018

(65) Prior Publication Data
US 2018/0324347 A1 Nov. 8, 2018

(30) Foreign Application Priority Data
May 2, 2017 (JP) .................... 2017-091946

(51) Int. Cl.
*G06F 3/041* (2006.01)
*H04N 5/232* (2006.01)

(52) U.S. Cl.
CPC ....... *H04N 5/23206* (2013.01); *G06F 3/0416* (2013.01); *H04N 5/23212* (2013.01);
(Continued)

(58) Field of Classification Search
CPC ......... H04N 5/23206; H04N 5/232939; H04N 5/23212; H04N 5/23216; H04N 5/23229; G06F 3/0416
See application file for complete search history.

(56) References Cited

U.S. PATENT DOCUMENTS

2002/0005907 A1* 1/2002 Alten .................... H04N 5/232
348/333.11
2010/0265413 A1* 10/2010 Seo ...................... H04N 5/4403
348/734
(Continued)

FOREIGN PATENT DOCUMENTS

JP 10-093848 A 4/1998
JP 2000-152147 A 5/2000
(Continued)

OTHER PUBLICATIONS

The above foreign patent documents were cited in the Dec. 10, 2018 Japanese Office Action, which is enclosed without an English Translation, that issued in Japanese Patent Application No. 2017091946.
(Continued)

*Primary Examiner* — Nicholas G Giles
(74) *Attorney, Agent, or Firm* — Cowan, Liebowitz & Latman, P.C.

(57) ABSTRACT

An image capturing apparatus capable of being remotely controlled from an external apparatus, comprises an image capturing unit, a communication unit configured to communicate with the external apparatus, a reception unit configured to receive a control instruction from the external apparatus via the communication unit, and a control unit configured to control the image capturing apparatus based on the received control instruction, wherein, when a connection with the external apparatus by the communication unit is disconnected during moving image recording in accordance with remote control from the external apparatus, the control unit continues the moving image recording and notifies a user whether to stop the moving image recording.

13 Claims, 7 Drawing Sheets (52) U.S. Cl.
CPC ..... *H04N 5/23216* (2013.01); *H04N 5/23229* (2013.01); *H04N 5/232939* (2018.08)

(56) References Cited

U.S. PATENT DOCUMENTS

| | | | |
|---|---|---|---|
| 2014/0176736 A1* | 6/2014 | Sato | H04N 1/00344 |
| | | | 348/207.11 |
| 2015/0103196 A1* | 4/2015 | Shin | H04N 5/23203 |
| | | | 348/211.1 |
| 2018/0041701 A1* | 2/2018 | Yanagi | H04W 4/80 |

FOREIGN PATENT DOCUMENTS

| | | |
|---|---|---|
| JP | 2005-128839 A | 5/2005 |
| JP | 2005-159396 A | 6/2005 |
| JP | 2007-158604 A | 6/2007 |
| JP | 2007-325097 A | 12/2007 |
| JP | 2009-044472 A | 2/2009 |
| JP | 2011-172094 A | 9/2011 |
| JP | 2014-143540 A | 8/2014 |
| JP | 2016-152432 A | 8/2016 |
| JP | 2017-046176 A | 3/2017 |

OTHER PUBLICATIONS

The above foreign patent documents were cited in a European Search Report dated Sep. 12, 2018, which is enclosed, that issued in the corresponding European Patent Application No. 18163357.9.

* cited by examiner

IMAGE CAPTURING APPARATUS AND METHOD OF CONTROLLING SAME WITH NOTIFICATION WHETHER TO STOP MOVING IMAGE RECORDING

BACKGROUND OF THE INVENTION

Field of the Invention

The present invention relates to an image capturing apparatus and a control method thereof, particularly relates to a technique for controlling an image capturing apparatus from outside.

Description of the Related Art

In recent years, digital cameras that can be connected to by a smart device including a mobile telephone via a wireless LAN (Local Area Network) or Bluetooth® and can be remotely operated from the smart device are known. In addition, a remote shooting system in which a live image captured by a digital camera is transferred to a smart device by wireless communication and an instruction for starting/stopping shooting is performed while the live image from the digital camera is confirmed by a screen of the smart device is known.

In addition, among remote shooting systems, there is a system that, in order to suppress generated heat or power consumption, turns off (hides) a display unit of a camera and does not accept an operation with respect to the camera during remote shooting, and stops remote shooting when communication is disconnected.

Japanese Patent Laid-Open No. 2017-46176 recites a technique for, in remote shooting, enabling moving image recording in accordance with a remote operation from a smart device regardless of what shooting mode a camera is in, and stopping moving image shooting when the camera is not in a moving image mode when communication is disconnected.

However, in Japanese Patent Laid-Open No. 2017-46176, there is no support for a use case of desiring to continue moving image recording even when in a mode that is not a moving image mode at a time of communication disconnection. Accordingly, while moving image recording in accordance with remote shooting continues even in a case where communication is disconnected during the moving image recording, having a user be able to decide whether or not to stop the moving image recording is considered desirable in view of improving convenience.

SUMMARY OF THE INVENTION

The present invention has been made in consideration of the aforementioned problems, and realizes a technique for improving convenience by, while moving image recording in accordance with remote shooting continues even if communication is disconnected during the moving image recording, having a user be able to stop the moving image recording.

In order to solve the aforementioned problems, the present invention provides an image capturing apparatus capable of being remotely controlled from an external apparatus, comprising: an image capturing unit; a communication unit configured to communicate with the external apparatus; a reception unit configured to receive a control instruction from the external apparatus via the communication unit; and a control unit configured to control the image capturing apparatus based on the received control instruction, wherein, when a connection with the external apparatus by the communication unit is disconnected during moving image recording in accordance with remote control from the external apparatus, the control unit continues the moving image recording and notifies a user whether to stop the moving image recording.

In order to solve the aforementioned problems, the present invention provides a control method of an image capturing apparatus having image capturing unit and capable of being remotely controlled from an external apparatus, the method comprising: receiving a control instruction from the external apparatus which is connected via a communication unit; controlling the image capturing apparatus based on the received control instruction; and when a connection with the external apparatus by the communication unit is disconnected during moving image recording in accordance with remote control from the external apparatus, continuing the moving image recording and notifying a user whether to stop the moving image recording.

In order to solve the aforementioned problems, the present invention provides a non-transitory computer-readable storage medium storing a program for causing a computer to function as an image capturing apparatus capable of being remotely controlled from an external apparatus, comprising: an image capturing unit; a communication unit configured to communicate with the external apparatus; a reception unit configured to receive a control instruction from the external apparatus via the communication unit; and a control unit configured to control the image capturing apparatus based on the received control instruction, wherein, when a connection with the external apparatus by the communication unit is disconnected during moving image recording in accordance with remote control from the external apparatus, the control unit continues the moving image recording and notifies a user whether to stop the moving image recording.

Accordingly to the present invention, it is possible to improve convenience by, while moving image recording in accordance with remote shooting continues even if communication is disconnected during the moving image recording, having a user be able to stop the moving image recording.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

[First Embodiment]

Below, explanation is given regarding a system that can be applied to a digital camera and a smart device as an image capturing apparatus and a communication apparatus of the present invention, and can control a digital camera 100 from outside by a smart device 200. Note that the smart device may be a digital camera with an attached wireless function, a smart phone that is a type of mobile telephone, a tablet device, a personal computer, and a wearable computer such as a wristwatch-type smart watch or eyeglasses-type smart glasses.

<Configuration of Digital Camera 100>

Figure 1A:
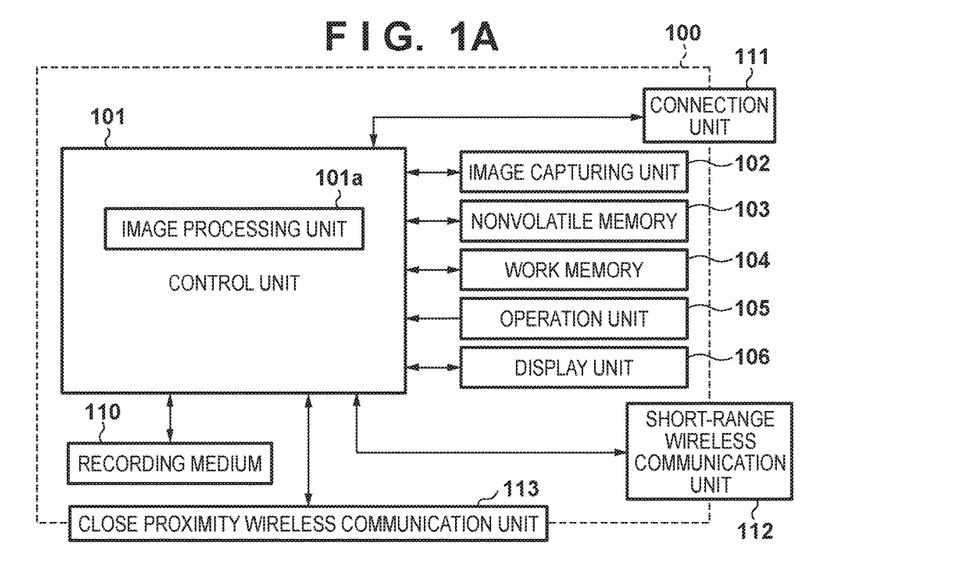
FIG. 1A is a block diagram of a digital camera of the present embodiment.

The configuration and functions of the digital camera 100 which is an example of the image capturing apparatus according to the present embodiment will be described with reference to FIG. 1A.

Note that, in the present embodiment, description is given regarding a digital camera that can shoot a still image or a moving image as an example of an image capturing apparatus, but there is no limitation to this, and an image capturing apparatus may be an information processing apparatus such as a personal computer or a tablet device with an attached camera function, a monitoring camera, a medical camera, or the like.

A control unit 101 is an arithmetic processing unit (CPU) which comprehensively controls the digital camera 100 overall, and implements communication processing and control processing (to be described later) by executing programs stored in a nonvolatile memory 103 (to be described later). Note that a plurality of pieces of hardware may control the overall apparatus by sharing processes instead of making the control unit 101 control the overall apparatus.

An image capturing unit 102 includes a lens group including a zoom lens and a focus lens and a shutter having a stop function. The image capturing unit 102 also includes an image sensor formed from a CCD, CMOS device, or the like which converts an object image into electrical signal, and an A/D converter which converts the analog image signal output from the image sensor into digital signal. Under the control of the control unit 101, the image capturing unit 102 converts optical image of an object formed by the lens included in the image capturing unit 102 into electric signal by the image sensor, performs noise reduction processing or the like on the converted signal, and outputs image data composed of digital signal.

The control unit 101 includes an image processing unit 101a. The image processing unit 101a performs resizing processing, such as pixel interpolation and reduction, and color conversion processing on image data captured by the image capturing unit 102. The image processing unit 101a generates an image file by compressing and coding still image data having undergone the above processing by JPEG or the like, or by encoding moving image data having undergone the above processing by moving image compression method such as MPEG2, H.264 or the like, and records the data in the recording medium 110. In the present embodiment, the image data is recorded in the recording medium 110 so as to conform to DCF (Design Rule for Camera File System) standard. The image processing unit 101a also performs predetermined arithmetic processing by using captured image data. The control unit 101 then controls the focus lens, stop, and shutter of the image capturing unit 102 based on the obtained arithmetic result, thereby performing AF (Automatic Focus) processing and AE (Automatic Exposure) processing.

The nonvolatile memory 103 is an electrically erasable/recordable memory, and, for example, an EEPROM is used. Constants, programs, and the like for the operation of the control unit 101 are recorded in the nonvolatile memory 103. In this case, the programs are those for executing remote shooting processing, which will be described later in this embodiment.

A work memory 104 is used as a work area where constants and variables for the operation of the control unit 101, programs read out from the nonvolatile memory 103, and the like are loaded. The work memory 104 is also used as a buffer memory for temporarily holding the image data captured by the image capturing unit 102 or an image display memory for a display unit 106.

An operation unit 105 is constituted by operation members such as various types of switches and buttons and a touch panel which accept various types of operations from the user. The operation unit 105 includes, for example, a power button for turning on/off a power supply, a shutter button for instructing shooting of a still image, a shutter button for instructing start/end of moving image recording, a reproduction button for instructing reproduction of an image, and a mode selection button for changing an operation mode of the digital camera 100 to a still image shooting mode, a moving image recording mode (including remote shooting) and a reproduction mode. The operation unit 105 also includes an operation member such as a dedicated connection button for starting a communication with the smart device 200 as an external apparatus (to be described later). A touch panel integrally formed with a display unit 106 (to be described later) is also included in the operation unit 105.

The shutter button is turned on to generate a first shutter switch signal SW1 when the shutter button is operated halfway, that is, half-pressed (shooting preparation instruction). Upon receiving the first shutter switch signal SW1, the control unit 101 controls the image capturing unit 102 to start an operation such as AF (Automatic Focus) processing, AE (Automatic Exposure) processing, AWB (Automatic White Balance) processing, or EF (Electronic Flash) processing. In addition, the shutter button is turned on to generate a second shutter switch signal SW2 when the shutter button is operated completely, that is, full-pressed (shooting instruction). Upon receiving the second shutter switch signal SW2, the control unit 101 starts a series of operations of shooting processing from reading out signal from the image capturing unit 102 to writing image data in the recording medium 110.

The display unit 106 displays a viewfinder image at the time of shooting, a captured image, and characters for a dialogical operation. The display unit 106 is, for example, a display device such as a liquid crystal display or organic EL display. The display unit 106 may be integrally formed with the digital camera 100 or an external apparatus connected to the digital camera 100. The digital camera 100 may be connected to the display unit 106 and may have a function of controlling display on the display unit 106.

The control unit 101 records image data output from the image capturing unit 102 in the recording medium 110. The control unit 101 reads out an already recorded image file from the recording medium 110. The recording medium 110 may be a memory card, hard disk drive, or the like mounted in the digital camera 100, or a flash memory or hard disk drive built in the digital camera 100. The digital camera 100 may have at least a function for accessing the recording medium 110.

The connection unit 111 is an interface for connection to an external apparatus such as the smart device 200 (to be described later). The digital camera 100 according to the present embodiment can exchange data with an external apparatus via the connection unit 111. For example, image data generated in the image processing unit 101a can be transmitted to an external apparatus via the connection unit 111. Note that in the present embodiment, the connection unit 111 includes an interface for performing communication with an external apparatus via a so-called wireless LAN complying with the IEEE802.11 standard. The control unit 101 implements wireless communication with an external apparatus by controlling the connection unit 111. Note that the communication method is not limited to a wireless LAN and may include, for example, a wireless communication interface such as an infrared communication method or wireless USB. Furthermore, wired connection function such as a USB cable, HDMI®, or IEEE 1394 or the like may be used.

The short-range wireless communication unit 112 includes, for example, an antenna for wireless communication and a modulation/demodulation circuit and a communication controller for processing wireless signal. The short-range wireless communication unit 112 outputs modulated wireless signal from the antenna, and demodulates the wireless signal received by the antenna, whereby short-range wireless communication complying with the IEEE802.15 standard (so-called Bluetooth®) is implemented. In the present embodiment, the short-range wireless communication adopts version 4.0 of Bluetooth® Low Energy (BLE) which is low power consumption, for example. This short-range wireless communication has a narrower communicable range than the wireless LAN communication (that is, the communicable distance is short), and the communication speed or rate is slower than wireless LAN communication. On the other hand, it consumes less power than wireless LAN communication.

The digital camera 100 according to the present embodiment can exchange data with an external apparatus such as the smart device 200 via the short-range wireless communication unit 112. For example, when a shooting command is received from an external apparatus, the shooting processing is executed by controlling the image capturing unit 102, and when receiving a command for exchanging data by communication via the wireless LAN, the control unit 101 controls the connection unit 111 to start wireless communication.

A close proximity wireless communication unit 113 includes, for example, an antenna for wireless communication, a modulation/demodulation circuit for processing wireless signal, and a communication controller. The close proximity wireless communication unit 113 outputs modulated wireless signal from the antenna and demodulates the wireless signal received by the antenna, whereby non-contact near field communication complying with the ISO/IEC18092 standard (so-called NFC: Near Field Communication) is implemented. The close proximity wireless communication unit 113 of the present embodiment is arranged on the side portion of the digital camera 100.

Figure 1B:
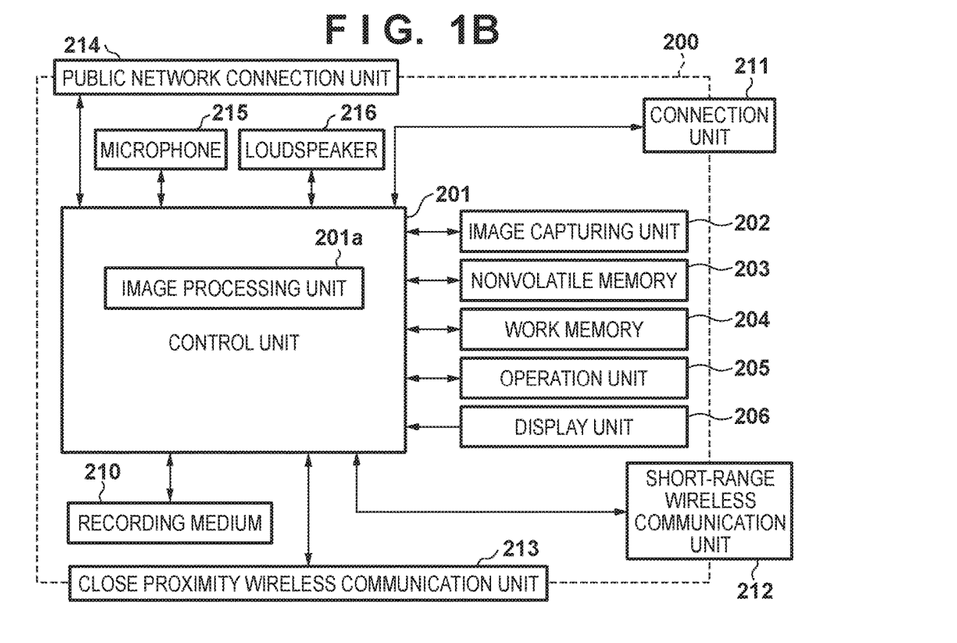
FIG. 1B is a block diagram of a smart device of the present embodiment.

The digital camera 100 connects to a close proximity wireless communication unit 213 of the smart device 200 and starts communication therewith by the close proximity wireless communication unit 113 when the digital camera 100 is brought into close proximity of the close proximity wireless communication unit 213. Note that in a case where a connection is made using the close proximity wireless communication unit 113, there is no necessity to have the close proximity wireless communication units 113 and 213 touch each other. Because communication is possible, even if the close proximity wireless communication units 113 and 213 are separated by a certain distance, to have a mutual connection it is sufficient if they are near each other within a range in which close proximity wireless communication is possible. Below approaching to within a range where the close proximity wireless communication is possible is described as "causing to be in close proximity".

In addition, communication is not started if the close proximity wireless communication units 113 and 213 are mutually in a range where close proximity wireless communication is impossible. In addition, in a case where the close proximity wireless communication units 113 and 213 are in a range where close proximity wireless communication with each other is possible and the devices communicate and are connected to each other, when the close proximity wireless communication units 113 and 213 are separated to a range where close proximity wireless communication with each other is impossible, the communication is disconnected and the connection is released. Note that contactless proximity communication realized by the close proximity wireless communication units 113 and 213 is not limited to NFC and other wireless communication may be employed. For example, contactless proximity communication in accordance with an ISO/IEC 14443 standard may be employed as contactless proximity communication that the close proximity wireless communication units 113 and 213 realize.

In the present embodiment, the communication speed or rate of the communication implemented by the connection unit 111 is higher than the communication speed of the communication implemented by the close proximity wireless communication unit 113, and the communicable range of the connection unit 111 is wider than the communicable range of the close proximity wireless communication unit 113.

In contrast, in communication by the close proximity wireless communication unit 113, because it is possible to limit a communication partner due to the narrowness of a range where communication is possible, processing such as an exchange of an encryption key needed for communication realized by the connection unit 111 is not necessary. In other words, communication can be performed more easily than using the connection unit 111.

Note that the connection unit 111 of the digital camera 100 in the present embodiment has an AP mode that operates as an access point in the infrastructure mode and a CL mode that operates as a client in the infrastructure mode. By operating the connection unit 111 in the CL mode, the digital camera 100 of the present embodiment can operate as a CL device in the infrastructure mode. When the digital camera 100 operates as the CL device, the digital camera 100 can join in the network formed by the AP device by connecting to the neighboring AP device. In addition, by operating the connection unit 111 in the AP mode, the digital camera 100 can operate as a simple AP (hereinafter referred to as "simple AP") which is a kind of AP, but has a limited function. When the digital camera 100 operates as the simple AP, the digital camera 100 forms a network by itself. A device in the vicinity of the digital camera 100 can recognize the digital camera 100 as the AP device and join in a network formed by the digital camera 100. Assume that the program for operating the digital camera 100 as described above is held in the nonvolatile memory 103.

Note that while the digital camera 100 in the present embodiment is a type of AP, it is a simple AP that does not have a gateway function for transferring data received from a CL device to an Internet provider or the like. Accordingly, even if data is received from another apparatus participating in a network formed by the self-apparatus, it is not possible to transfer this data to a network such as the Internet.

<Configuration of Smart Device 200>

The configuration and functions of a smart device 200 of the present embodiment will be described with reference to FIG. 1B.

The smart device 200 according to the present embodiment includes a control unit 201, an image processing unit 201a, an image capturing unit 202, a nonvolatile memory 203, a work memory 204, an operation unit 205, a display unit 206, a recording medium 210, a connection unit 211, a short-range wireless communication unit 212 and a close proximity wireless communication unit 213. The basic functions of the respective elements are the same as those of the digital camera 100, and hence a detailed description of them will be omitted.

The nonvolatile memory 203 stores an OS (operating system) which is the basic software executed by the control unit 201 and an application which implements an applicable function in cooperation with the OS. In the present embodiment, an application for communication with the digital camera 100 is also stored in the nonvolatile memory 203.

Processing of the smart device 200 in a remote shooting of the present embodiment is implemented by reading software provided by an application. Assume that an application has software for the use of the basic function of the OS installed in the smart device 200. Note that the OS of the smart device 200 may have software for implementing processing in the present embodiment.

The connection unit 211 includes a wireless LAN communication interface for wirelessly communicating with an external apparatus such as the digital camera 100. The control unit 201 implements wireless communication with an external apparatus by controlling the connection unit 211. Note that the connection unit 211 may be directly connected to the digital camera 100 or may be connected via an access point. As a protocol for a data communication, PTP/IP (Picture Transfer Protocol over Internet Protocol) through a wireless LAN, for example, can be used. Note that the communication with the digital camera 100 is not limited to this communication method.

In short-range wireless communication with the digital camera 100, the short-range wireless communication unit 212 needs to initially connect with the short-range wireless communication unit 112 of the digital camera 100 in accordance with an operation for a one-to-one connection for short-range wireless communication referred to as pairing. In the pairing operation, for example the digital camera 100 is a Peripheral, and uses the short-range wireless communication unit 112 to perform an operation referred to as Advertise for notifying the vicinity of its presence. The smart device 200 operates as Central, and, by performing a Scan operation in accordance with the short-range wireless communication unit 212, discovers the digital camera 100, and performs a join request in accordance with an Initiate operation to thereby perform a short-range wireless communication connection. Note that there are cases where the term pairing is limited in use to a time of a Bluetooth connection which accompanies encryption, but in the present embodiment an operation for making a one-to-one connection that uses short-range wireless communication, regardless the existence or absence of encryption, is referred to as pairing.

Upon receiving a data read request from another device, the close proximity wireless communication unit 213 outputs response data based on data stored in the nonvolatile memory 203. In the present embodiment, the smart device 200 mainly acts as Initiator, and, via the close proximity wireless communication unit 213, operates in a card reader mode, a card writer mode, and a P2P mode which are defined in an NFC standard. In contrast, the digital camera 100 mainly acts as Target, via the close proximity wireless communication unit 113.

A public network connection unit 214 is an interface used for wireless communication via Wide Area Network (WAN) such as 3G or LTE. The smart device 200 can perform telephone call and data communication with another device via the public network connection unit 214. When performing telephone call, the control unit 201 inputs and outputs voice signals via a microphone 215 and a loudspeaker 216. Assume that in the present embodiment, the public network connection unit 214 is not limited to 3G or LTE and it is possible to use another communication method such as WiMAX, ADSL or FTTH. In the present embodiment, the public network connection unit 214 has an antenna, and the control unit 201 can connect to the public network via the antenna. Note that the connection unit 211 and the public network connection unit 214 need not be implemented by independent pieces of hardware. For example, one antenna can have both the functions.

<Remote Shooting Function>

Figure 2:
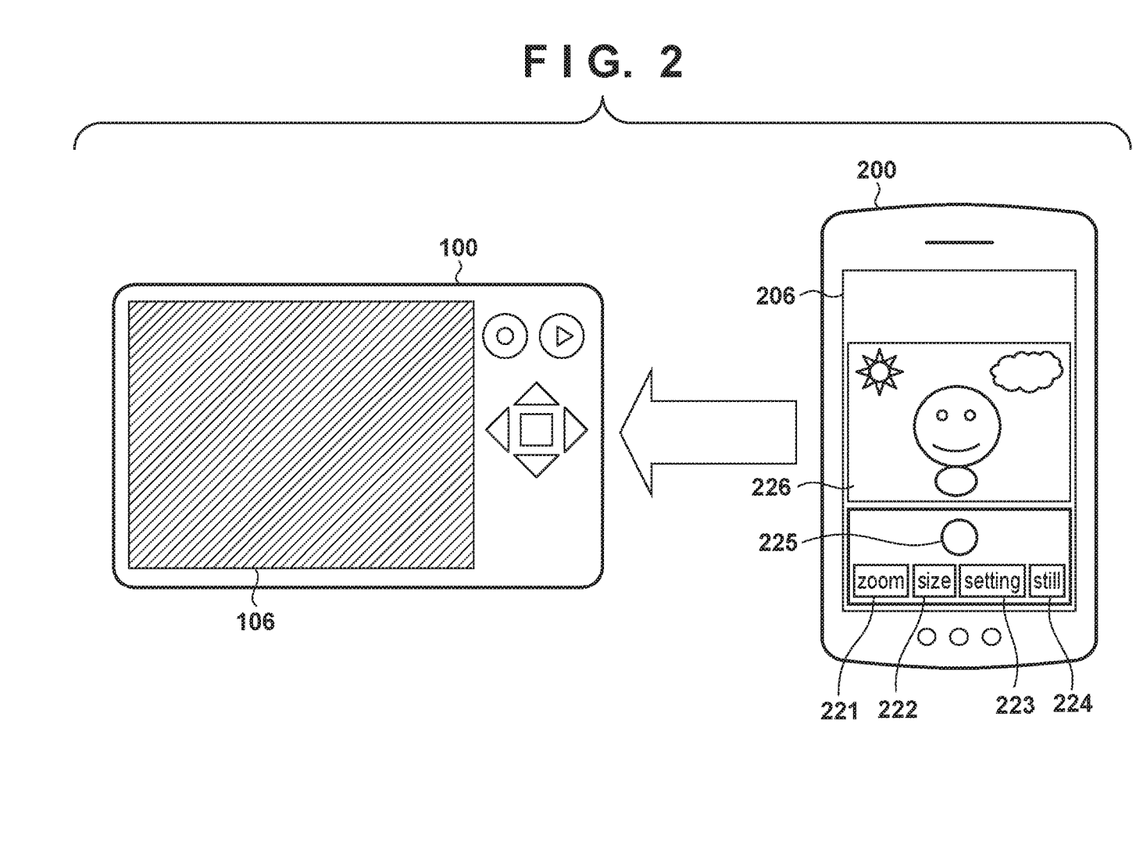
FIG. 2 is a view for describing an operation at a time of remote shooting of the present embodiment.

Next, with reference to FIG. 2, description is given regarding a remote shooting function of the present embodiment.

The digital camera 100 and the smart device 200 perform wireless communication, find each others device by a mutual device discovery protocol, and establish a connection by a data communication protocol. When the connection between the devices completes, by the activation of an application on the smart device, it is possible to perform a moving image recording start instruction or a still image shooting instruction to the digital camera 100 from the smart device 200. A control instruction that can be executed from the smart device 200 is a zoom operation in accordance with a zoom button 221, a moving image size change operation in accordance with a size button 222, various setting operations in accordance with a setting button 223, a still image shooting start operation in accordance with a still image button 224, a moving image recording start/end operation in accordance with a recording button 225, or the like.

When the connection with the smart device 200 is established, the display unit 106 of the digital camera 100 is set to off (hidden) in order to suppress an increase of a processing load at a time of remote shooting, and generated heat or power consumption in conjunction therewith. In addition, by a similar reason, operations with respect to the digital camera 100 other than power off are disabled at a time of remote shooting.

In addition, when the connection with the digital camera 100 is established, a live image 226 captured by the digital camera 100 is transmitted in real time to the smart device 200 and displayed on the display unit 206. While viewing the live image 226, a user is capable of an operation such as aligning a focus by touching any location on the image.

<Processing of Digital Camera 100>

Figure 3:
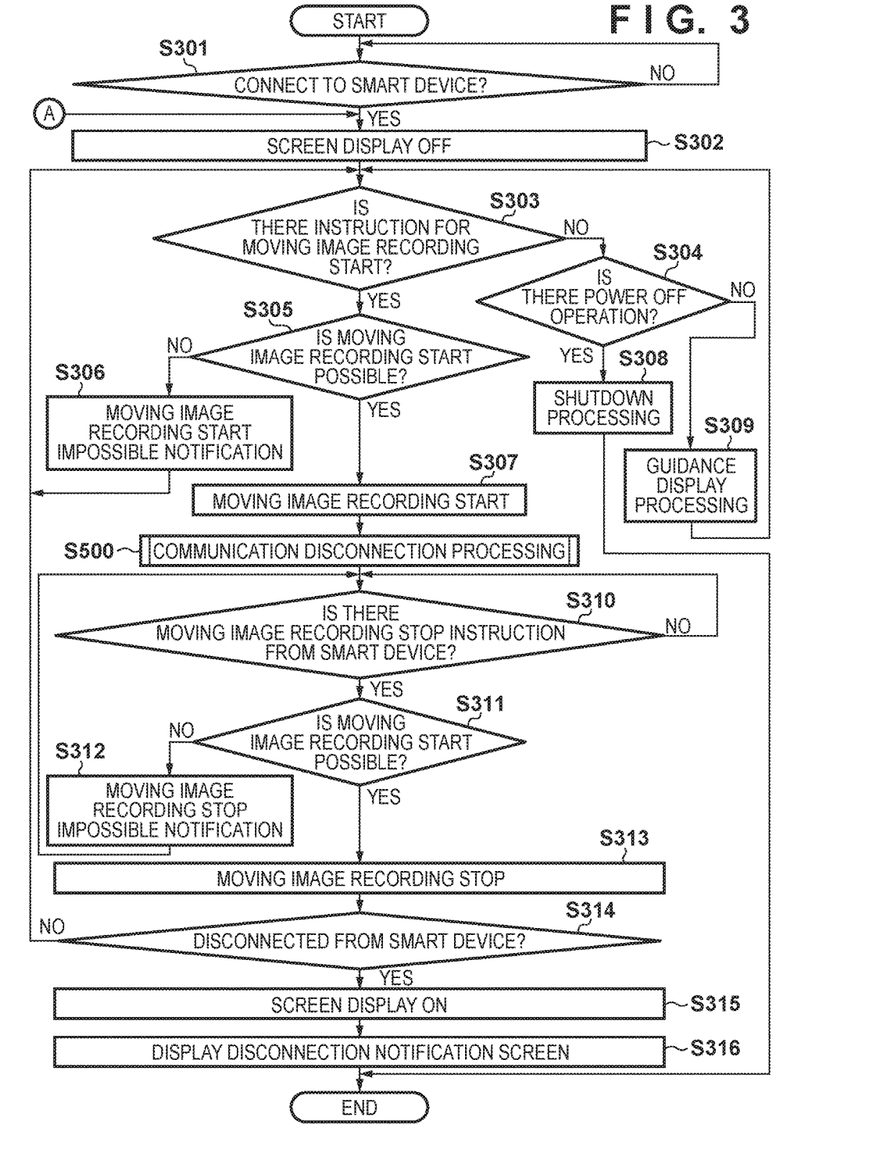
FIG. 3 is a flowchart illustrating processing by a digital camera at a time of remote shooting.

Next, with reference to FIG. 3, description is given regarding processing of the digital camera 100 at a time of remote shooting. Note that, in the present embodiment, description is given of an example of moving image recording processing at a time of remote shooting, and description regarding other functions is omitted.

Note that the processing of FIG. 3 is started from a state where the connection unit 111 of the digital camera 100 has performed wireless communication with the connection unit 211 of the smart device 200 and established a connection.

In step S301, the control unit 101 advances the processing to step S302 when the connection with the smart device 200 via the connection unit 111 completes.

In step S302, the control unit 101 turns off (hides) the display unit 106 of the digital camera 100, and advances the processing to step S303. By turning the display unit 106 off at a time of remote shooting, there is an effect for suppressing generated heat and reducing power consumption.

In step S303, the control unit 101 transitions to a shooting standby state for waiting for a moving image recording start instruction from the smart device 200. Basically, operations with respect to the digital camera 100 other than power off are disabled at a time of remote shooting.

Figure 6A:
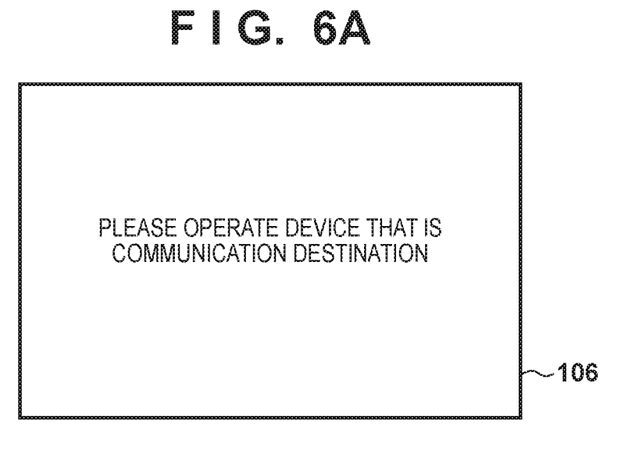
FIGS. 6A to 6B are views illustrating display examples of a digital camera at a time of remote shooting.

In step S304, the control unit 101, upon detecting a power off operation in the shooting standby state, advances the processing to step S308 and performs power OFF processing of the digital camera 100. In the power OFF processing, the control unit 101 performs shutdown processing of the digital camera 100, and this processing ends. In addition, in step S304, in a case where an operation other than a power off operation is performed, the processing advances to step S309, and the control unit 101 enables the display unit 106 to display for a certain amount of time guidance prompting a user for an operation on the smart device 200 as illustrated in FIG. 6A, in order to notify the user that operations with respect to the digital camera 100 are disabled.

In the shooting standby state of step S303, the control unit 101, upon receiving a moving image recording start instruction from the smart device 200, advances the processing to step S305.

In step S305, the control unit 101 determines whether the digital camera 100 is in a state where moving image recording is possible. A state where moving image recording is possible is determined based on a remaining capacity of the recording medium 110, and whether heat of the camera main body will not affect image quality, for example. In step S305, in a case of determining that moving image recording is impossible, the control unit 101 advances the processing to step S306, and makes a notification to the smart device 200 that moving image recording is impossible via the connection unit 111. In addition, in step S305, upon determining that moving image recording is possible, the control unit 101 advances the processing to step S307.

In step S307 the control unit 101 starts moving image recording and then advances processing to step S500. In step S500, the control unit 101 executes communication disconnection processing for during moving image recording which is described later by FIG. 5.

In step S310, the control unit 101 waits until it receives a moving image recording stop instruction from the smart device 200 during the moving image recording. In step S310, upon determining that a moving image recording stop instruction has been received, the control unit 101 advances the processing to step S311.

In step S311, the control unit 101 determines whether the digital camera 100 is in a state where a moving image recording stop is possible. A condition where a moving image recording stop is impossible is, for example, a state where moving image recording cannot be stopped internally due to being during zoom driving, touch AF processing, or the like. In step S311, upon determining that the control unit 101 is in a state where a moving image recording stop is impossible, the control unit 101 advances the processing to step S312.

In step S312, the control unit 101 makes a notification that moving image recording stop is impossible to the smart device 200 via the connection unit 111. In addition, in step S311, the control unit 101, upon determining that it is in a state where a moving image recording stop is possible, advances the processing to step S313 and stops the moving image recording.

In step S314, the control unit 101 determines whether the connection with the smart device 200 has been disconnected, and upon determining that the connection has not been disconnected the control unit 101 returns the processing to step S302, and upon determining that the connection has been disconnected, the control unit 101 advances the processing to step S315.

Figure 6B:
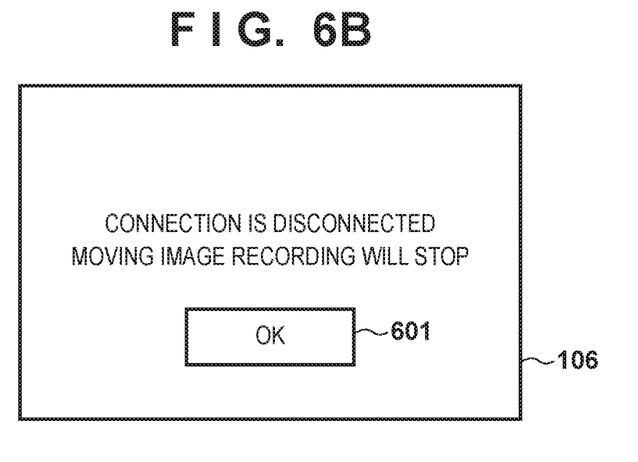

Subsequently, the control unit 101 turns on the display unit 106 to switch to a state where display is possible (step S315), and displays a disconnection notification screen illustrated in FIG. 6B (step S316), and ends the processing. In this way, by notifying a communication disconnection, it is possible to reliably notify a user that the connection with the smart device 200 has been disconnected. In addition, because the disconnection notification screen is displayed until the OK button 601 of the disconnection notification screen illustrated in FIG. 6B is touched, a possibility of mistakenly operating the digital camera 100 can be reduced.

<Processing of the Smart Device 200>

Figure 4:
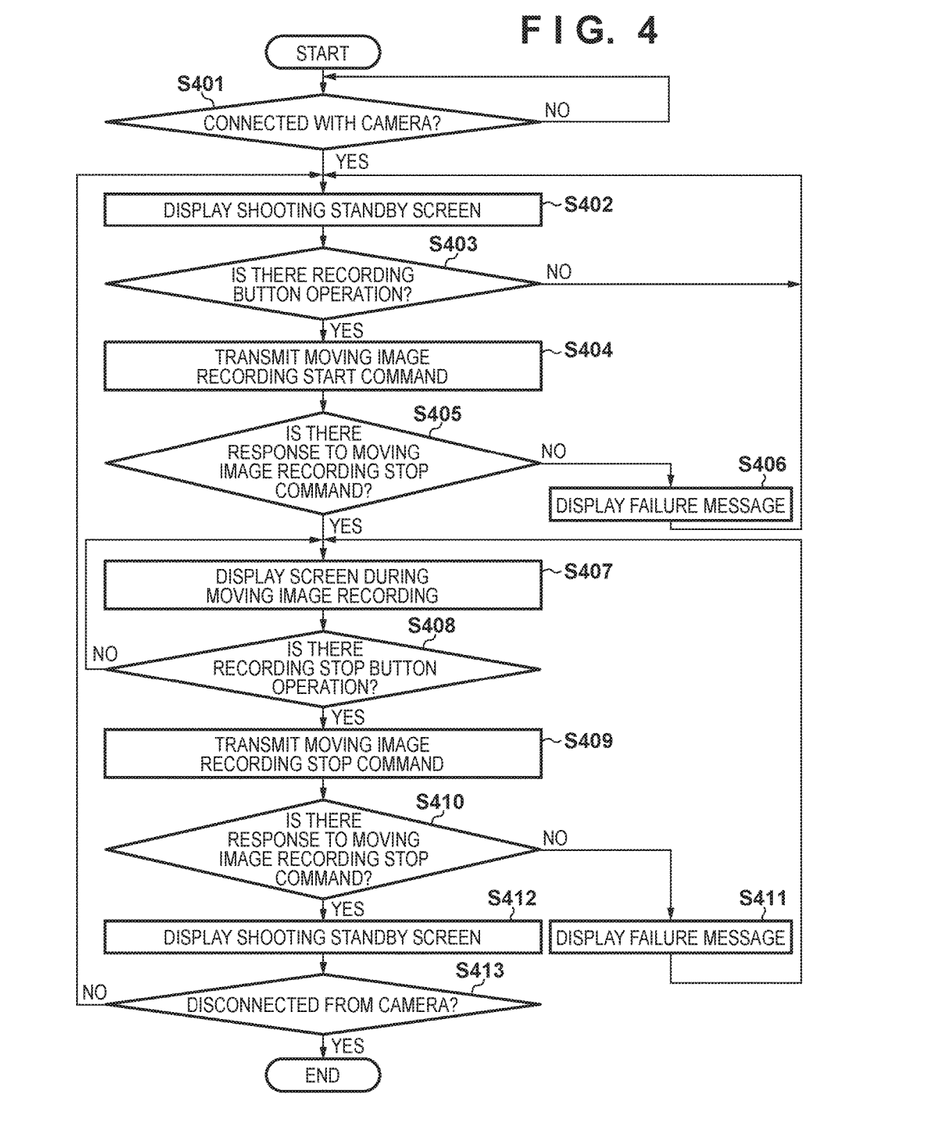
FIG. 4 is a flowchart illustrating processing by a smart device at a time of remote shooting.

Next, with reference to FIG. 4, description is given regarding processing of the smart device 200 at a time of remote shooting. Note that, in the present embodiment, description is given of an example of moving image recording processing at a time of remote shooting, and description regarding other functions is omitted.

Note that the processing of FIG. 4 is started from a state where the connection unit 111 of the digital camera 100 has performed wireless communication with the connection unit 211 of the smart device 200 and established a connection.

In step S401, the control unit 201 advances the processing to step S402 when the connection with the digital camera 100 via the connection unit 211 completes.

Figure 7A:
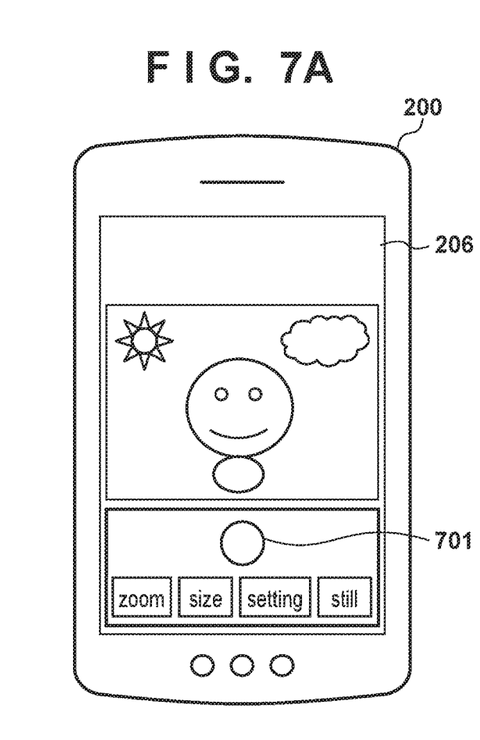
FIGS. 7A to 7C are views illustrating display examples of a smart device at a time of remote shooting.

In step S402, the control unit 201 controls the display unit 206 so as to display a shooting standby screen as illustrated in FIG. 7A. A recording button 701 for making a moving image recording start/end instruction is displayed on the shooting standby screen, and moving image recording is started by a user touching the video recording button 701.

In step S403, the control unit 201 determines whether the recording button 701 has been touched, and upon determining that the recording button 701 has been touched the control unit 201 advances the processing to step S404, and upon determining that the recording button 701 has not been touched the control unit 201 returns the processing to step S402 and continues the display of the shooting standby screen.

In step S404, the control unit 201 transmits via the connection unit 211 a command to the digital camera 100 for instructing a moving image recording start.

In step S405, the control unit 201 determines whether a response from the digital camera 100 has been received, and upon receiving a response the control unit 201 advances the processing to step S407, and when a response is not received the control unit 201 advances the processing to step S406.

Figure 7B:
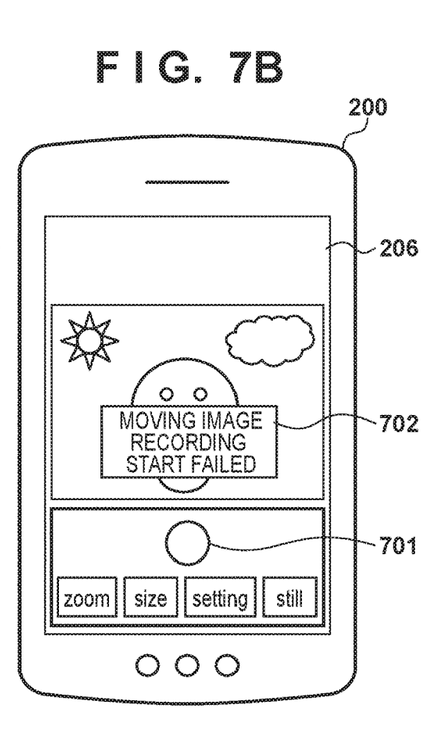

In step S406, the control unit 201 controls the display unit 206 so as to display a message 702 as illustrated by FIG. 7B for notifying a user that the start of the moving image recording failed. In this way, by notifying that a moving image recording start has failed, a user can confirm at a glance that the instruction for the moving image recording start is not able to be carried out. Note that a user can start moving image recording by touching the recording button 701 again on the screen of FIG. 7B.

Figure 7C:
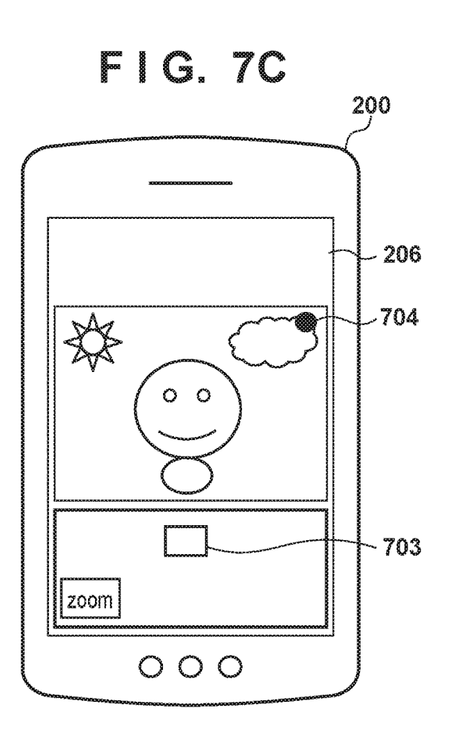

In step S407, the control unit 201 controls the display unit 206 so as to display a screen for when recording a moving image as illustrated in FIG. 7C. In the screen for when recording a moving image, the recording button 701 displayed in the shooting standby screen of FIG. 7A which has a round shape is changed to a recording stop button 703 which has a square shape. In addition, in the screen for when recording a moving image, an image icon 704 representing that moving image recording is underway is displayed, and an operation button corresponding to a function that cannot be executed or a parameters that cannot be set are displayed set to a disabled state where operation is impossible, such as graying out, during the moving image recording.

In step S408, the control unit 201 determines whether the recording stop button 703 has been touched in the screen for when recording a moving image. In step S408, the control unit 201 advances the processing to step S410 upon determining that the recording stop button 703 has been touched, and returns the processing to step S407 and continues display of the screen for when recording a moving image when the recording stop button 703 has not been touched.

In step S409, the control unit 201 transmits via the connection unit 211 a command to the digital camera 100 for instructing a moving image recording stop.

In step S410, the control unit 201 determines whether a response from the digital camera 100 has been received, and upon receiving a response the control unit 201 advances the processing to step S412, and when a response is not received the control unit 201 advances the processing to step S411.

In step S411, the control unit 201 controls the display unit 206 so as to display a message for notifying a user on the screen for when recording a moving image of FIG. 7C that stopping of moving image recording has failed, and subsequently returns the processing to step S407, and continues the display of the screen for when recording a moving image. In this way, by displaying a message or the like for representing that a moving image recording stop failed, a user can recognize that the instruction for moving image recording stop is not able to be reliably performed. Note that a user can stop moving image recording by touching the recording stop button 703 again on the screen of FIG. 7C.

In step S412, the control unit 201 controls the display unit 206 so as to display a shooting standby screen as illustrated in FIG. 7A.

In step S413, the control unit 201 determines whether the connection with the digital camera 100 has been disconnected, and upon determining that the connection has not been disconnected the control unit 201 returns the processing to step S402, and upon determining that the connection has been disconnected, the control unit 201 ends the processing.

The above is the sequence for the moving image recording processing at a time of remote shooting for the smart device 200.

<Communication Disconnection Processing During Moving Image Recording>

Figure 5:
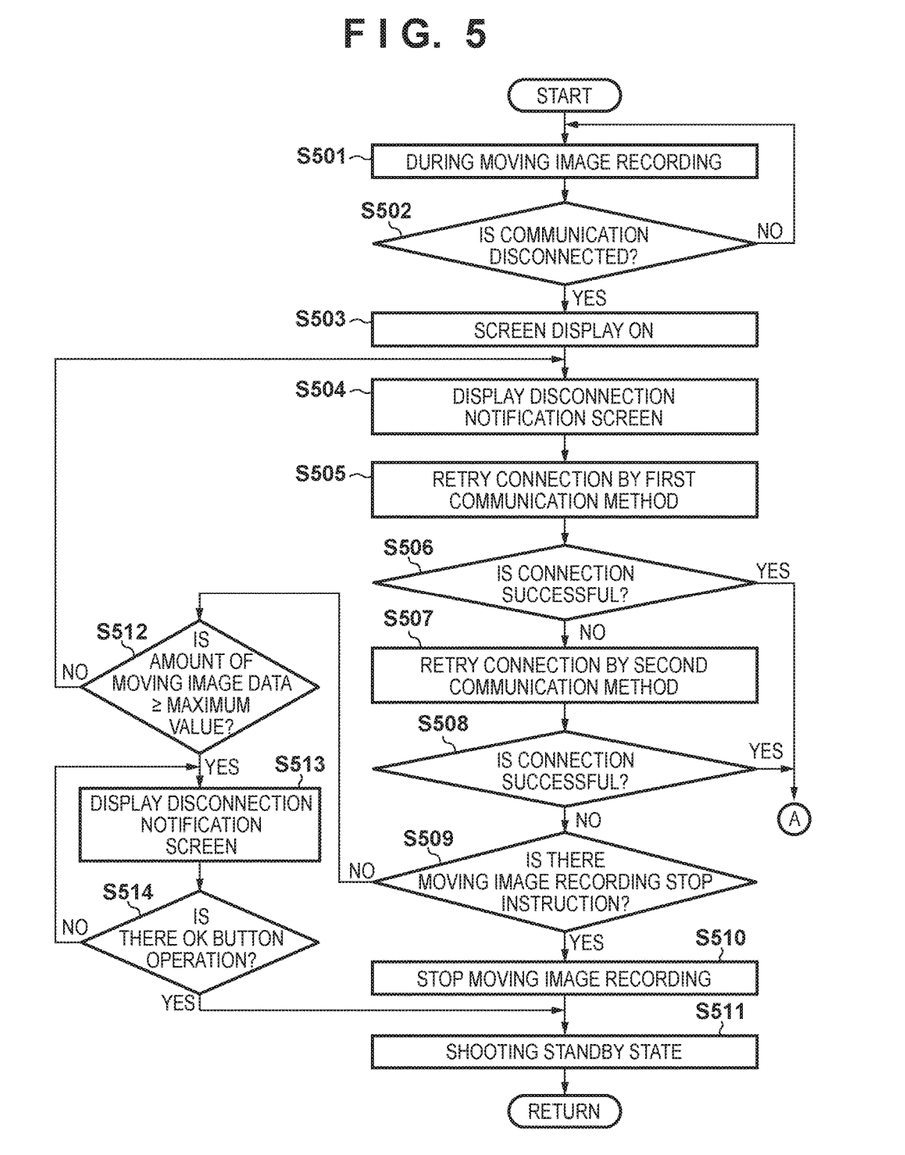
FIG. 5 is a flowchart for illustrating communication disconnection processing during moving image recording.

Next, with reference to FIG. 5, explanation is given regarding communication disconnection processing during moving image recording in step S500 of FIG. 3.

FIG. 5 illustrates processing of the digital camera 100 for a case where the connection with the smart device 200 is disconnected after the moving image recording start in step S307 of FIG. 3.

In step S501, the control unit 101 transitions to a state in which moving image recording is in progress, and upon detecting in step S502 that the connection with the smart device 200 via the connection unit 111 has been disconnected, advances the processing to step S503.

In step S503, the control unit 101 turns on the display unit 106 to change to a state where display is possible, and in step S504 displays a disconnection notification screen illustrated by FIG. 6B. Note that moving image recording continues during display of the disconnection notification screen, and the moving image recording is first stopped by the user touching the OK button 601. In this way, by displaying the disconnection notification screen which represents that the connection with the smart device 200 has been disconnected, it is possible to reliably notify a user that, although the connection with the smart device 200 has been disconnected, the moving image recording is continuing. In addition, convenience is improved because, in a case of desiring to stop the moving image recording, a user can stop the moving image recording by touching the OK button 601.

In step S505, the control unit 101 performs retry processing for attempting a reconnection in accordance with a first communication method (for example, wireless LAN) via the connection unit 111, while displaying the moving image recording stop screen. The retry processing may be performed a plurality of times.

In step S506, the control unit 101 determines whether a connection has been established by the retry processing in step S505, and advances the processing to step S302 of FIG. 3 upon determining that a connection is established, and advances the processing to step S507 upon determining that the retry processing failed with no connection established.

In step S507, the control unit 101 performs retry processing for attempting a reconnection by a second communication method (for example, Bluetooth®) via the short-range wireless communication unit 112. The retry processing may be performed a plurality of times.

In step S508, the control unit 101 determines whether a connection has been established by the retry processing in step S507, and advances the processing to step S302 of FIG. 3 upon determining that a connection is established, and advances the processing to step S509 upon determining that the retry processing failed with no connection established.

In step S509, the control unit 101 determines whether it has received a moving image recording stop instruction by the OK button 601 being touched on the disconnection notification screen illustrated on FIG. 6B. The control unit 101, advances the processing to step S510 upon determining that a moving image recording stop instruction has been received, and advances the processing to step S512 upon determining that a moving image recording stop instruction has not been received.

In step S510, the control unit 101 stops the moving image recording, and in step S511 transitions to a shooting standby state.

In step S512, because the moving image recording continues while the display of the moving image recording stop screen continues, the control unit 101 determines whether an amount of moving image data recorded has reached an upper limit that can be recorded. In step S512, the control unit 101 returns the processing to step S504 to perform retry processing again upon determining that the amount of moving image data has not reached the upper limit, and advances the processing to step S513 upon determining that the upper limit has been reached.

In step S513, the control unit 101 stops the moving image recording, and displays the disconnection notification screen illustrated in FIG. 6B.

In step S514, the control unit 101 continues screen display and moving image recording until the OK button 601 in the disconnection notification screen illustrated in FIG. 6B is touched, and, upon determining that the OK button 601 has been touched, advances the processing to step S511, and transitions to a standby state.

By virtue of the present embodiment, in a case where the digital camera 100 is controlled from outside by the smart device 200 to perform moving image recording, the moving image recording is not stopped even if an unexpected event, such as the disconnection of communication during the moving image recording, occurs, and deciding whether to stop the moving image recording on a user side is possible. In this way, by continuing moving image recording at a time of a communication disconnection during the moving image recording and confirming whether to stop the moving image recording on the user side, it is possible to improve convenience at a time of remote shooting.

Although the present invention has been explained in detail above based on suitable embodiments thereof, the present invention is not limited to these specific embodiments, and various forms of a scope that does not deviate from the spirit of this invention are included in the invention. In addition, in the embodiment described above, description has been given by taking moving image recording as an example, but there is no need to be limited to this. Anything may be used if it is a shooting format provided by the digital camera 100, such as audio recording, or continuous shooting, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091946, filed May 2, 2017 which is hereby incorporated by reference herein in its entirety.

What is claimed is:

1. An image capturing apparatus capable of being remotely controlled from an external apparatus, comprising:
   an image capturing unit;
   a communication unit configured to communicate with the external apparatus;
   a reception unit configured to receive a control instruction from the external apparatus via the communication unit; and
   a control unit configured to control the image capturing apparatus based on the received control instruction,
   wherein, when a connection with the external apparatus by the communication unit is disconnected during moving image recording in accordance with remote control from the external apparatus, the control unit continues the moving image recording and notifies a user whether to stop the moving image recording.

2. The apparatus according to claim 1, further comprising a display unit,
   wherein the control unit notifies the user of whether to stop the moving image recording by displaying on the display unit an operation member for stopping the moving image recording in accordance with the remote control from the external apparatus.

3. The apparatus according to claim 2, wherein
   the control unit hides the display unit after connecting with the external apparatus by the communication unit, and
   displays the operation member on the display unit when the connection with the external apparatus by the communication unit is disconnected during the moving image recording.

4. The apparatus according to claim 2, wherein
   the control unit hides the display unit and transmits a live image to the external apparatus by the communication unit during the moving image recording.

5. The apparatus according to claim 2, wherein
   when the connection with the external apparatus is disconnected, the control unit attempts a reconnection with the external apparatus by the communication unit, and keeps the display unit as hidden when the reconnection is successful.

6. The apparatus according to claim 2, further comprising a second communication unit configured to communicate with the external apparatus by a communication method differing to that of the communication unit,
   when the connection with the external apparatus is disconnected, the control unit attempts a reconnection with the external apparatus by the communication unit, and, when the reconnection is not successful, attempts a reconnection with the external apparatus by the second communication unit, and, when the reconnection is successful, keeps the display unit as hidden.

7. The apparatus according to claim 2, wherein
when the connection with the external apparatus is disconnected, the control unit switches to a state where the display unit can display.

8. The apparatus according to claim 7, wherein
the control unit displays on the display unit that the connection with the external apparatus has been disconnected.

9. The apparatus according to claim 7, wherein
the control unit displays a live image on the display unit.

10. The apparatus according to claim 1, wherein
upon receiving a start instruction or a stop instruction for the moving image recording from the external apparatus via the communication unit, the control unit determines whether the control unit is in a state where starting or stopping the moving image recording is possible, and transmits that starting or stopping the moving image recording is not possible to the external apparatus.

11. The apparatus according to claim 1, wherein
the communication unit communicates with the external apparatus by a wireless connection.

12. A control method of an image capturing apparatus having image capturing unit and capable of being remotely controlled from an external apparatus, the method comprising:
receiving a control instruction from the external apparatus which is connected via a communication unit;
controlling the image capturing apparatus based on the received control instruction; and
when a connection with the external apparatus by the communication unit is disconnected during moving image recording in accordance with remote control from the external apparatus, continuing the moving image recording and notifying a user whether to stop the moving image recording.

13. A non-transitory computer-readable storage medium storing a program for causing a computer to function as an image capturing apparatus capable of being remotely controlled from an external apparatus, comprising:
an image capturing unit;
a communication unit configured to communicate with the external apparatus;
a reception unit configured to receive a control instruction from the external apparatus via the communication unit; and
a control unit configured to control the image capturing apparatus based on the received control instruction,
wherein, when a connection with the external apparatus by the communication unit is disconnected during moving image recording in accordance with remote control from the external apparatus, the control unit continues the moving image recording and notifies a user whether to stop the moving image recording.

* * * * *